(12) United States Patent
Brinkhuis et al.

(10) Patent No.: US 9,260,626 B2
(45) Date of Patent: *Feb. 16, 2016

(54) CROSSLINKABLE COMPOSITION

(71) Applicant: NUPLEX RESINS B.V., Bergen Op Zoom (NL)

(72) Inventors: Richard Hendrikus Gerrit Brinkhuis, Zwolle (NL); Antonius Johannes Wilhelmus Buser, Wehl (NL); Petrus Johannes Maria David Elfrink, Boxmeer (NL); Ferry Ludovicus Thys, Stevens-Woluwe (BE); Elwin Aloysius Cornelius Adrianus De Wolf, Hoogerheide (NL)

(73) Assignee: Nuplex Resins B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,257

(22) Filed: Apr. 7, 2014

(65) Prior Publication Data

US 2014/0228507 A1    Aug. 14, 2014

Related U.S. Application Data

(63) Continuation of application No. PCT/EP2012/069906, filed on Oct. 8, 2012.

(30) Foreign Application Priority Data

Oct. 7, 2011  (EP) .................................... 11184439

(51) Int. Cl.
*C09D 167/00*   (2006.01)
*C08J 3/24*   (2006.01)
*B01J 31/02*   (2006.01)

(52) U.S. Cl.
CPC ........... *C09D 167/00* (2013.01); *B01J 31/0205* (2013.01); *B01J 31/0239* (2013.01); *B01J 31/0268* (2013.01); *C08J 3/24* (2013.01); *B01J 2231/341* (2013.01); *C08J 2367/00* (2013.01); *C08J 2369/00* (2013.01); *C08J 2375/04* (2013.01)

(58) Field of Classification Search
CPC ........ C08J 3/24; C08J 2367/00; C09D 167/00
USPC .......................................... 524/599, 502, 539
See application file for complete search history.

(56) References Cited

U.S. PATENT DOCUMENTS

2005/0137275 A1    6/2005 Nefzger et al.

FOREIGN PATENT DOCUMENTS

| CN | 1637031 A | 7/2005 |
|---|---|---|
| CN | 1757656 A | 4/2006 |
| CN | 1976972 A | 6/2007 |
| EP | 0192304 A1 | 8/1986 |
| EP | 0198519 A1 | 10/1986 |
| EP | 0808860 A2 | 11/1997 |
| EP | 1541606 A1 | 12/2004 |
| EP | 1593727 A1 | 11/2005 |
| EP | 1761582 | 1/2006 |
| EP | 1838747 | 7/2006 |
| EP | 1641887 B1 | 10/2010 |
| EP | 1902081 B1 | 12/2010 |
| EP | 2374836 A1 | 10/2011 |
| EP | 1641888 B1 | 2/2012 |
| JP | 200418859 A | 1/2004 |
| WO | 2008157468 A1 | 12/2008 |
| WO | 2011124663 A1 | 10/2011 |

OTHER PUBLICATIONS

T. Jung et al.—Farbe und Lacke Oct. 2003.
International Search Report PCT/EP2012/069906.

*Primary Examiner* — James J Seidleck
*Assistant Examiner* — Deve E Valdez
(74) *Attorney, Agent, or Firm* — Ramin Amirsehhi; David P. Owen; Hoyng Rokh Monegier LLP (57) ABSTRACT

An RMA crosslinkable composition for making thick coating layers having at least one crosslinkable component comprising reactive components A and B each including at least 2 reactive groups wherein the at least 2 reactive groups of component A are acidic protons (C—H) in activated methylene or methine groups, and the at least 2 reactive groups of component B are activated unsaturated groups (C=C), to achieve crosslinking by Real Michael Addition reaction, the composition further including a base catalyst (C), an X—H group containing component (D) that is also a Michael addition donor reactable with component B under the action of catalyst C, wherein X is C, N, P, O or S and a sag control component (E). A crosslinkable composition is also disclosed for preparing thick coating layers having a dry thickness of at least 70 mu having a surface appearance and hardness of the resulting cured composition.

18 Claims, 4 Drawing Sheets

Fig. 1

Appendix: Photographs of cured coatings

CROSSLINKABLE COMPOSITION

CROSS REFERENCE TO RELATED APPLICATIONS

This application is a continuation of PCT application number PCT/EP2012/069906 filed on 8 Oct. 2012, which claims priority from European application number 11184439.5 filed on 7 Oct. 2011. Both applications are hereby incorporated by reference in their entireties.

BACKGROUND OF THE INVENTION

1. Field of the Invention

The present invention relates to a crosslinkable composition crosslinkable by Real Michael Addition (RMA) reaction wherein a component with at least 2 activated unsaturated groups (hereafter also referred to as the RMA acceptor) and a component with at least 2 acidic protons C—H in activated methylene or methine groups (hereafter also referred to as the RMA donor) react and crosslink to each other in the presence of a strong base catalyst.

2. Description of the Related Art

RMA chemistry can be tuned to give very fast curing compositions (also at lower curing temperatures) in coating compositions at acceptable or good pot lives and good material properties, which makes this chemistry very attractive as a basis for coating compositions. Details of RMA crosslinkable compositions using a latent based cross-linking catalyst are described in application PCT/EP2011/055463 which is herewith incorporated by reference.

Real Michael addition is activated by strong bases, but also inhibited by the presence of acidic species that will consume these basic catalysts. In tuning the reactivity of coating systems in view of achieving a desirable drying profile, there are various requirements to balance. The drying profile (also referred to as the reaction profile or as the curing profile) is the progress of the cross-linking reaction as a function of time. It is required that the drying profile allows build-up of mechanical properties as fast as possible, to help the productivity of the coater. It is further also required to have a drying profile that is robust, i.e. the reactivity (and hence the resulting drying profile) is not strongly influenced by accidental low levels of acidic contaminants being present.

On the other hand it is required to have a good appearance of the resulting coating. This implies the need for sufficient levelling you are during the immediate period after application, when the curing coating composition is present as a liquid and capable of such levelling. This also implies the need for absence of artefacts like solvent inclusions or gas inclusions or other surface irregularities that may occur if curing is very fast, especially if it is faster at the surface than in deeper layers, which is often the case if curing occurs at the time scale of solvent evaporation or surface activation of a catalyst. Also film hardness build-up will be affected under conditions in which solvent entrapment occurs.

The described requirements are to some extent opposing each other. For a fast curing profile, but also for a high robustness against accidental acid contaminants high levels of catalyst are preferred, whereas at the same time such high levels of catalysts may negatively influence surface appearance and hardness development. The object of the invention is to provide an RMA cross-linkable composition that provides a better balance in these apparently counteracting requirements in particular in crosslinkable compositions having a high solid content.

BRIEF SUMMARY OF THE INVENTION

There is also a desire for crosslinkable compositions that can be simply cured in ambient conditions as opposed to for example compositions comprising photo-latent amine catalysts, known from T. Jung et al Farbe and Lacke October 2003. Such photo-latent amine catalysts that do generate a strong base on UV radiation, are not suitable for coating more complex irregular substrates where parts of the surfaces are not reachable with UV or visible light, or for highly pigmented systems.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings.

According to the invention there is provided a RMA crosslinkable composition for making thick coating layers comprising at least one crosslinkable component comprising reactive components A and B each comprising at least 2 reactive groups wherein the at least 2 reactive groups of component A are acidic protons (C—H) in activated methylene or methine groups (the RMA donor group), and the at least 2 reactive groups of component B are activated unsaturated groups (C=C) (the RMA acceptor group), to achieve crosslinking by Real Michael Addition (RMA) reaction, said composition further comprising a base catalyst (C), an X—H group containing component (D) that is also a Michael addition donor reactable with component B under the action of catalyst C, wherein X is C, N, P, O or S and a sag control component (E).

In a preferred cross-linkable composition according the invention the RMA acceptor groups B are acryloyl groups and preferably the RMA donor groups A predominantly are malonate groups.

The inventors have found that by using X—H group containing component D as described in an catalysed RMA crosslinkable composition, it is possible to create a reactivity profile comprising an initial induction time of lowered reaction rate directly after application and activation of the system, followed by a relative increase of reactivity in later stages. This induction time can be tuned, to allow a "open time" the period allowing flow and solvent and entrapped air bubbles to escape The induction time allows a significantly higher amount of flow and levelling of the system, avoiding surface defects that may result from very fast cure without these additives, and better hardness build-up due to reduced solvent entrapment, while still benefiting from the full potential of the catalysts beyond this induction time, thus creating an acceleration of the reaction at later stages to complete crosslinking at higher rate than would be found if simply using lower catalyst levels. Also the high sensitivity of lower catalyst levels towards accidentally present acid contaminations is avoided.

Although the advantages of the invention are apparent in layers of normal thickness, the crosslinkable composition according to the invention is particularly suitable for making thick layers. Thick layers are considered to be layers having a cured dry thickness of at least 70 micrometers. In thick layer applications the risk of air and solvent inclusions is higher. This is particularly pronounced in RMA crosslinkable compositions that are cured at low temperature in the range from 10 to 60° C. where resins are more viscous and levelling is difficult. Further, it is of particular importance that the nature of the solvent, and the relative amounts in a solvent mixture are appropriately chosen to give good appearance of the thick coating, and avoid excessive solvent entrapment and resulting plastization. The criticality of the choice also depends on the way and the temperature of application of the coating composition on the substrate: for example spraying generally results in air inclusion, that must have an opportunity to escape from the film. If the solvent is too volatile, evaporation and cure may be too quick and air bubbles may be entrapped in the cured at coating. There should be sufficient time to allow air to escape from the uncured coating layer. If the solvent is not volatile enough solvent may be entrapped because the coating is cured faster than solvent evaporated, further solvent diffusion being extremely slow at full cure conditions. There should be sufficient 'open time' to allow solvent to escape from the curing coating layer. The skilled person can determine the optimum conditions and choice of the solvent in view of minimizing the air and solvent inclusions. However, this becomes increasingly difficult for thick layers. A particular advantage of the invention is that the open time is significantly increased so that not only good leveling is achieved but also the solvent inclusion and air inclusion is minimized and the criticality of chosing the application conditions and solvent type and amount is reduced.

Figure 1:
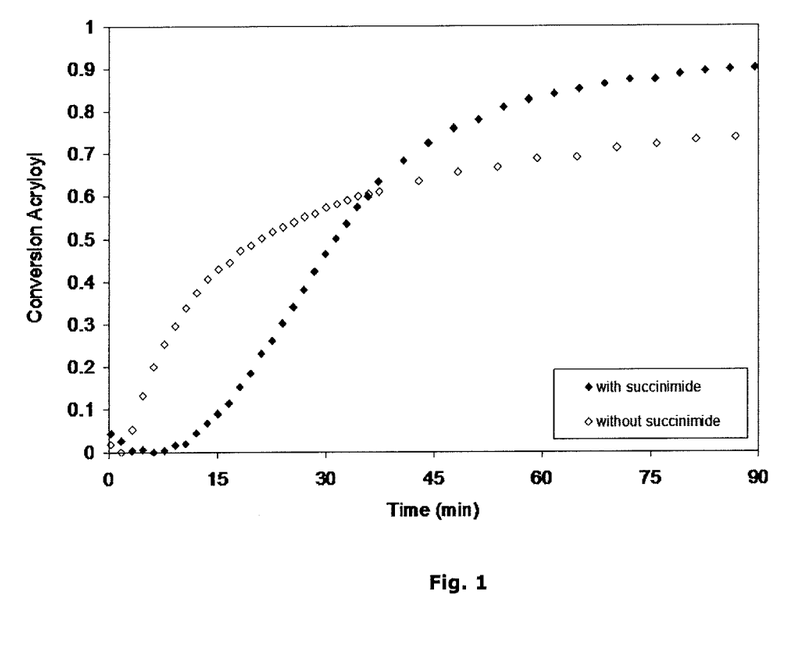
FIG. 1 illustrates the conversion of the acryloyl (as followed by FTIR at 809 $cm^{-1}$) in the preferred acryloyl/malonate system using succinimid as component D.
Figure 2:
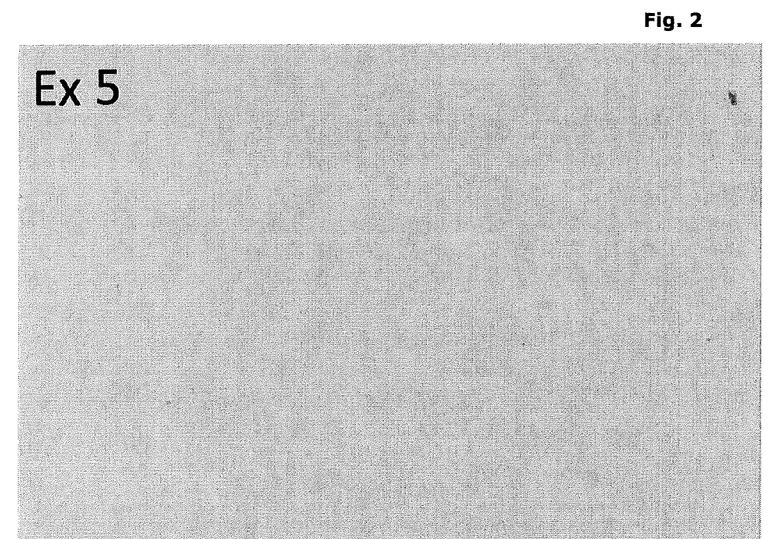
FIGS. 2 to 7 are microscope pictures of the cured coatings on panels at approximately 100 mu dry film thickness.
Figure 3:
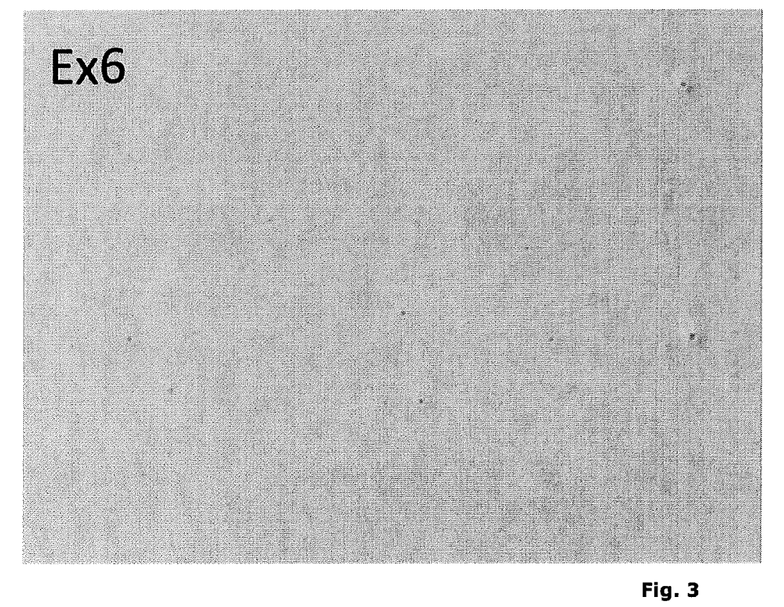
Figure 4:
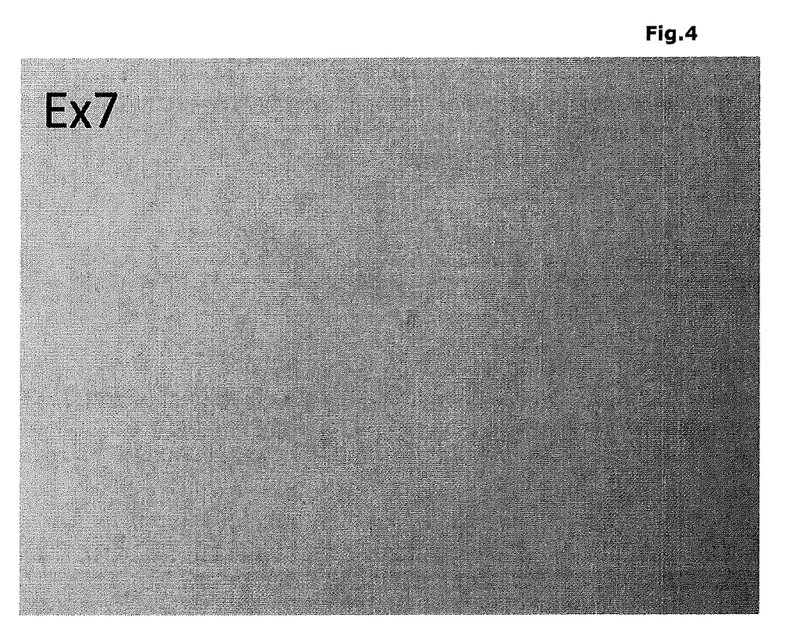
Figure 5:
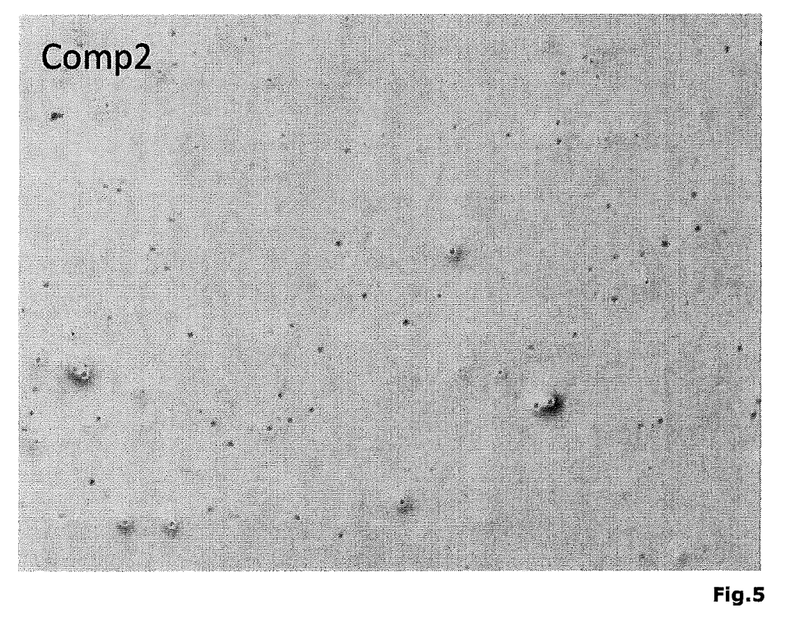
Figure 6:
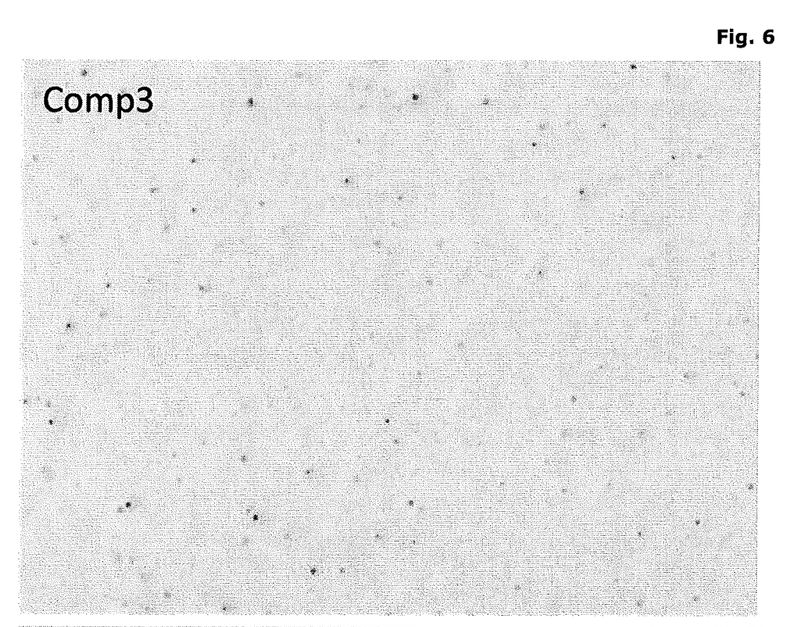
Figure 7:
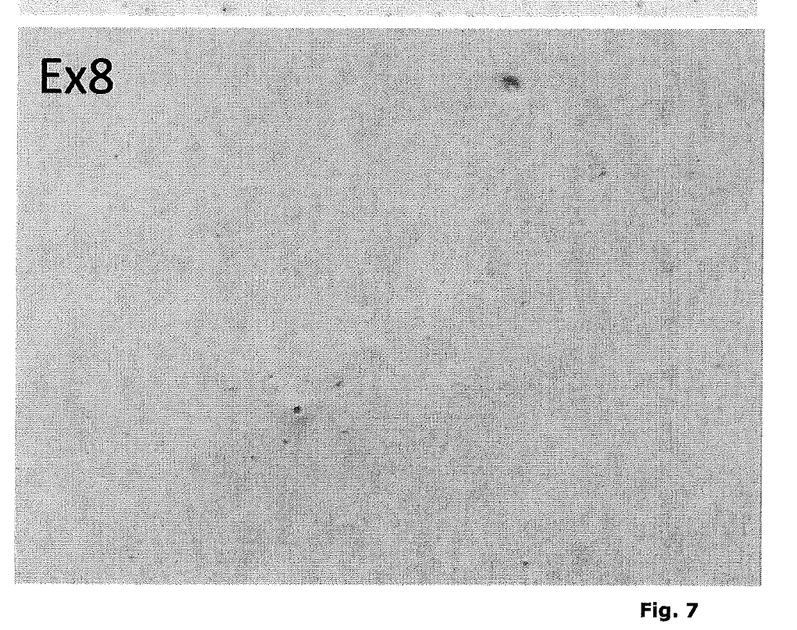

The effect obtained according to the invention is illustrated in FIG. 1 which describes the conversion of the acryloyl (as followed by FTIR at 809 $cm^{-1}$) in the preferred acryloyl/malonate system using succinimid as component D. The crosslinkable composition without component D has a very quick hardness build up (open diamond). The profile of the same composition with component D (closed diamond) shows that the open time modifying component D creates an induction time in the reactivity profile in which the conversion is slowed down and after which the conversion accelerates to give fast cure completion. This effect cannot simply be obtained by chosing a lower amount of catalyst C.

The components in the crosslinkable composition form an acid-base equilibrium system. The reactivity profile of the crosslinkable composition is the result of the choice of relative pKa values of the acidic components A and D in the composition that contribute to the acid-base equilibrium system and the relative reactivity of the deprotonated forms of the components towards component B.

The X—H group in component D has a higher acidity than the C—H groups in component A, preferably being characterized in that component D has a pKa (defined in aqueous environment) of at least one unit, preferably two units, less than that of component A. Preferably the pKa of the X—H group in component D is lower than 13, preferable lower than 12, more preferably lower than 11 most preferably lower than 10. An excessive acidity may create problems with components in the catalyst system; therefore hence the pKa is preferably higher than 7, more preferably 8, more preferably higher than 8.5. The acidity difference assures that on application of the coating, component D is activated (deprotonated) preferentially over component A.

Suitable components D can be chosen on the basis of pKa values as indicated from the group consisting of succinimide (9.5), ethosuximide (9.3), 5,5-dimethylhydantoin (10.2), 1,2,4-triazole (10.2), 1,2,3-triazole (9.4), benzotriazole (8.2), benzenesulfonamide (10.1), nitromethane (10.2), isatine (10.3), uracil (9.9), 4-nitro-2-methylimidazole (9.6), phenol (10.0), ethylacetoacetate (10.7), acetylacetone (9.0), diethylmalonate (13.0).

It is preferred that component D has a reactivity in a Michael addition towards component B such that, when present in a mixture alongside the C—H functional groups of component A and a base catalyst, it will convert relatively faster, compared to the C—H of component A. This preference of D converting faster than A helps creating an induction time. Such a preference can be established by formulation both components A and D (or model compounds with similar functional groups) in similar amounts, with a limited amount of a component with similar functional groups as component B (e.g. butylacrylate, such that the amount of RMA donor groups to RMA acceptor groups is 2 to 1), and completing the Michael addition in the presence of a base, and analyzing the results with a suitable technique, e.g with LC or NMR. The conditions (e.g. temperature) are then best chosen close to the conditions to used in curing. As a first guideline, this can done under room temperature conditions.

It is further preferred that component D has a reactivity towards a Michael addition when activated with a base, which is lower by at least a factor 3 compared to that of the C—H groups in component A, when either is tested under comparable conditions in a formulation at room temperature with excess of RMA acceptor groups B, and in presence of a base at least able to deprotonate 1 mole % of the RMA donor. The lower reactivity of D anions towards B compared to that of A anions, helps creating an induction time. When considering its application for other curing temperatures, this relative reactivity is best determined at adjusted temperatures.

The catalyst C is mixed with components A and B shortly before use. Components A and B are usually stored together and should have a long shelf life. Component D can be mixed and stored with catalyst C or with components A and B. In particular in the latter case, in view of maintaining acceptable pot life and shelf life, it is preferred that the X—H group of component D is not too highly reactive towards the Component B (eg acryloyl) in absence of the base catalyst C; ie without activation by a base. Therefore, it is preferred that the component D has a reactivity in a Michael addition towards component B such that, without base activation, it has a room-temperature half-time when dissolved in butylacrylate of more than 30 minutes, preferably more than 1 hour, preferably more than 2 hours, preferably more than 4 hours, more preferably more than 8 hours, still more preferably more than 24 hours, most preferably more than 72 hours.

Preferably component D is selected from one or more compounds from the group of Compounds D1 comprising C—H acidic protons (X is C) in activated methylene or methine groups and Compounds D2 comprising N—H acidic compound (X is N).

Suitable components D2 are an aza-acidic compounds (X is N) preferably comprising a molecule containing the N—H as part of a group —(C=O)—NH—(C=O)—, or of a group —NH—(O=S=O)— or a heterocycle in which the nitrogen of the N—H group is contained in a heterocyclic ring, more preferably component D2 is an imide derivative, preferably an (optionally substituted) succinimide or glutarimide.

Other suitable components D2 are hydantoin derivatives, for example 5,5-dimethylhydrantoin, sulfonamides, for example aromatic sulfonamides as benzene- or toluene-sulfonamide or heterocyclic compounds, for example triazoles or a pyrazoles, or a uracil derivative.

In the crosslinkable composition, the X—H groups in component D are present in an amount corresponding to at least 50 mole %, preferable at least 100 mole %, most preferably at least 150 mole % relative to the amount of base to be generated by catalyst C. The appropriate amount is very much determined by the acid base characteristics of component D relative to component A, and the reactivity of the corresponding anions relative to B, so may vary for different systems. It is noted that the open time improving effect can in some cases be obtained at very small amounts of component D, which is very advantageous because such small amounts do not or not significantly affect the properties of the resulting cured composition; for example the chemical and mechanical properties of a coating. Typically the X—H groups in component D are present in an amount corresponding to no more than 30 mole %, preferably no more than 20, more preferably no more than 10, most preferably no more than 5 mole % relative to C—H donor groups from component A.

It should be noted that component D may be present in its deprotonated form (in acid base equilibrium with other components). Amounts for component D referred to include both the neutral as well as the deprotonated form. This implies that if present in amounts of more than 100% relative to a base catalyst C, components C and D may be in equilibrium such that effectively the deprotonated form of D is present as the dominant species to initiate further RMA cure (rather then coexist as basic (C) and acidic (D) species in the formulation). Preferably, the X—H functionality (number of groups per molecule) of component D is low, preferably less than 4, more preferably less than 2, most preferably it is 1.

The crosslinkable composition may comprise next to one or more different components D a component D1 comprising acidic protons (C—H) in activated methylene or methine groups having a higher acidity than component A and which are also is reactive towards component B, Such component D1 can also contribute to the open time improving effect, however in order to have a significant effect D1 should be typically be present in an amount between 10-40 mol % (relative to total RMA C—H), which is a significantly higher amount than for component D.

The difference in acidity of the two C—H acidic components A and D1 is chosen preferably in that wherein the pKa of component D1 is between 0.5 and 6, preferably between 1 and 5 and more preferably between 1.5 and 4 units lower than the pKa of component A. Preferably, component A is a malonate containing component and component D1 is an acetoacetate or acetylacetone containing component, preferably of low C—H functionality (preferably less than 10, more preferably less than 5, most preferably it is no more than 2.

Component A

Suitable examples of components A containing activated methylene or methine groups are well known in the art. Preferred are the oligomeric and/or polymeric A group containing components such as, for example, polyesters, polyurethanes, polyacrylates, epoxy resins, polyamides and polyvinyl resins containing groups A in the main chain, pendant or both.

Component A preferably is malonate or acetoacetate. Components containing both malonate and acetoacetate groups in the same molecule are also suitable. Additionally, physical mixtures of malonate and acetoacetate group-containing components are suitable.

In a most preferred embodiment of the crosslinkable composition, component A is a malonate containing compound. It is preferred that in the crosslinkable composition the majority of the activated C—H groups are from malonate, that is more than 50%, preferably more than 60%, more preferably more than 70%, most preferably more than 80% of all activated C—H groups in the crosslinkable composition are from malonate. In another embodiment, the crosslinking composition comprises a component A, for example a polymer, wherein more than 50%, preferably more than 70%, more preferably more than 80% and most preferably more than 90% of the activated C—H groups are from malonate and a separate component, for example another polymer, oligomer or monomer, comprising activated C—H groups not from malonate, for example acetoacetate.

Especially preferred malonate group-containing components for use with the present invention are the malonate group-containing oligomeric or polymeric esters, ethers, urethanes and epoxy esters containing 1-50, more preferably 2-10, malonate groups per molecule. In practice polyesters and polyurethanes are preferred. It is also preferred that such malonate group-containing components have a number average molecular weight (Mn) in the range of from about 100 to about 5000, more preferably, 250-2500, and an acid number of about 2 or less. Also monomalonates can be used as they have 2 reactive C—H per molecule. Monomeric malonates can, in addition, be used as reactive diluents.

Component B

Components B generally can be ethylenically unsaturated components in which the carbon-carbon double bond is activated by an electron-withdrawing group, e.g. a carbonyl group in the alpha-position. Suitable components B are known in the art, for example acryloyl esters, acrylamides, alternatively polyesters based upon maleic, fumaric and/or itaconic acid (and maleic and itaconic anhydride and polyesters, polyurethanes, polyethers and/or alkyd resins containing pendant activated unsaturated groups. Acrylates, fumarates and maleates are preferred. Most preferably, the component B is an unsaturated acryloyl functional component.

It is also especially preferred that the acid value of the activated unsaturated group-containing components (as of any of other component used in the composition) is sufficiently low to not substantially impair activity of the catalyst, so preferably less than about 2, most preferably less than 1 mg KOH/g. As exemplified by the previously incorporated references, these and other activated unsaturated group-containing components, and their methods of production, are generally known to those skilled in the art, and need no further explanation here. Preferably the functionality is 2-20, the equivalent weight (EQW: average molecular weight per reactive functional group) is 100-2000, and the number average molecular weight preferably is Mn 200-5000.

The advantages of the invention are particularly manifest in critically difficult compositions comprising not only a high solids content but also aimed at a high crosslinking density, with relative high concentrations and functionalities of functional groups, for example in case the component A is a compound, in particular an oligomer or polymer, comprising an average of 2 to 30, preferably 4 to 20 and more preferably 4-10 activate C—H per polymer chain.

It is also possible that component A and B are present in hybrid molecules containing both types of functional groups.

Typically, the concentrations of the functional groups in components A and B, and their relative stoichiometry, are chosen such that good film properties following cure may be expected, with efficient use of these functional groups. Typically, stoichiometries C—H/C=C are chosen o be from 0.1 to 10, preferably 0.5 to 3, more preferably 0.7 to 3, most preferably 0.8/1.5. For this ratio, the X—H of component D is added to the C—H groups of component A.

Component C

The base catalyst C can in principle be any known catalyst suitable for catalyzing RMA reactions. Preferably, in view of achieving good pot-life in combination with low temperature curing, the crosslinkable composition comprises a catalyst system C comprising a strong based blocked by a volatile acid which is activated by evaporation of this acid. A suitable catalyst system C comprises a strong base blocked by a carbon dioxide, or the blocked catalytic species are of formula ROCO2-, R being an optionally substituted alkyl, preferably C1-C4 radical or hydrogen, preferably the catalyst comprises a blocked base anion and a non-acidic cation, preferably a quaternary ammonium or phosphonium cation. It is preferred that the crosslinking catalyst is utilized in an amount ranging between 0.001 and 0.3 meq/g solids, preferably between 0.01 and 0.2 meq/g solids, more preferably between 0.02 and 0.1 meq/g solids (meq/g solids defined as mmoles base relative to the total dry weight of the crosslinkable composition, not counting particulate fillers or pigments). Suitable catalyst C is described in PCT/EP2011/055463 herewith incorporated by reference. Alternatively, the catalyst system C is activated by reaction of an epoxy component with a tertiary amine, or an anion.

For the $CO_2$ deblocking catalyst systems, it was surprisingly found that significantly better potlife could be achieved in a composition wherein component A is a malonate, which composition further comprises 0.1-10 wt %, preferably 0.1-5, more preferably 0.2-3 and most preferably 0.5-2 wt % water (relative to total weight of the coating composition). Preferably, the amount of water is chosen in an effective amount to increase gel time with at least 15 minutes, preferably at least 30 min, more preferably at least 1 h, even more preferably at least 5 h, and most preferably at least 24 h, 48 h. or at least 10%, 50% or 100% compared to the same composition without water.

Component E

For preparing thick coating layers having a dry thickness of at least 70, 80, 90, or more than 100 and in particular at least 125 micrometer the cross linking composition preferably also comprises a sag control agent (SCA). At low temperature curing conditions used in RMA curing the choice of the SCA is particularly important in view of obtaining good surface and optical properties. Suitable SCA's having low haze are described in EP0198519 which describes a thixotropic coating composition comprising (1) a binder and (2) 0.1 to 30 percent by weight of solid particles of a diurea sag control agent, having a particle size of from 0.01 to 50 microns, which is the reaction product of (a) a symmetrical aliphatic or homocyclic diisocyanate and (b) a monoamine or diamine containing at least a primary amino group and an ether group. EP0192304 describes suitable SCA's based on isocyanurate.

Preferred SCA's for low temperature use are described in EP1641887 and EP1641888 which are a rheology control agents (SCA) obtainable by reacting one or more polyisocyanates with one or more monoamines or by reacting one or more polyamines with one or more monoisocyanates to form a polyurea compound, wherein at least one of the mono- or polyamine or mono- or polyisocyanate is optically active, not as racemic mixture, having a chiral carbon atom adjacent to an amine or isocyanate group.

Most preferred SCA's are described in EP1902081 describing a thixotropic agent SCA comprising a first polyurea reaction product of a first polyisocyanate with a first amine and a second polyurea reaction product of a second polyisocyanate with a second amine different from the first polyurea reaction product precipitated in the presence of the colloidal particles of the first reaction product. This SCA is used in the examples. EP1838747 describes a blend of 2 SCA's having different melting temperatures.

SCA is preferably made in the donor resin but can also be made in the acceptor resin composition by in-situ reacting the isocyanate with a amine compound.

The crosslinking composition can comprise a solvent. For $CO_2$ deblocking catalyst systems, the inventors further found that advantages can be achieved in pot life d if in the crosslinkable composition at least part of the solvent is a primary alcohol solvent. The solvent can be a mixture of a non-alcoholic solvent and an alcohol solvent. Preferably, the alcohol is present in an amount of at least 1, preferably 2, more preferably 3, most preferably at least 5, even more preferably at least 10 wt % relative to the total weight of the crosslinkable composition and in view of VOC constraints preferably at most 45, preferably at most 40 wt %, most preferably less than 30 wt %.

The alcohol solvent preferably is one or more primary alcohols, more preferably a mono-alcohol having 1 to 20, preferably 1-10, more preferably 1-6 carbon atoms, preferably selected from the group of ethanol, n-propanol, n-butanol, n-amyl alcohol and butylglycol In summary the crosslinkable composition according to the invention comprises
  a. between 5 and 95 wt % of a component A with at least 2 acidic protons C—H in activated methylene or methanemethine, and
  b. between 5 and 95 wt % of a component B with at least 2 activated unsaturated groups (wt % relative to the total weight of the crosslinkable composition) and
  c. a catalyst system C that contains, or is able to generate a basic catalyst capable of activating the RMA reaction between components A and B, at levels of 0.0001 and 0.5 meq/g solid components
  d. an amount of component D present in quantities of at least 50 mole % relative to base generated by component C, and preferably less than 30 mole % of C—H active groups from component A
  e. optionally a sag control agent (SCA),
  f. optionally between 0.1 and 80 wt % of solvent (preferably less than 45 wt %), preferably containing at least 1 wt % of a primary alcohol,
  g. optionally at least 0.5 wt % water.

Considering that the crosslinkable composition is a 2K composition which is only formed shortly before the actual use, the invention also relates to a kit of parts for the manufacture of the composition according to the invention comprising a part 1 comprising components A and B and part 2 comprising component C and D or alternatively a part 1 comprising components A, B and D and part 2 comprising component C.

The invention also relates to the use of the component D as described above as an additive to RMA cross-linkable compositions, in particular for preparing thick coating layers having a dry thickness of at least 50, preferably at least 60, 75, 100 and more preferably at least 125 micrometer, for the improvement of the open time of the crosslinkable composition and for the improvement of the appearance and hardness of the resulting cured composition, in particular a coating.

In the crosslinkable composition is in such a way the nature and amount of component D is chosen to yield, under the application and curing conditions chosen, an increase in time to get to a 30% conversion level, of at least 3, preferably 5, more preferably 10 minutes, preferably less than 60, more preferably less than 30 minutes, when compared to the same composition without component D.

The invention also relates to the use of the crosslinking composition according to the invention in a method for the manufacture of coating compositions, films or inks and to coating compositions, inks or films comprising the crosslinking composition according to the invention and further application oriented additives for example one or more coating additives like pigments, co-binder, solvents etc. It was found that RMA crosslinkable coating compositions, in particular also the composition for preparing thick layers herein described in thick layer applications, preferably have aminosilane as promotors of adhesion to substrates in particular on metal substrates like steel. Surprisingly high adhesion promotion was observed even at very low amounts between 0.1 and 2 wt % and even lower than 1.5, 1% or 0.5 wt % (total wt of the crosslinkable composition).

The invention also relates to a process for making a coating layer having a fully cured dry thickness of at least 70, 75, 80 or 100 and more preferably at least 125 micrometer and having a good surface appearance and hardness of the resulting cured composition comprising mixing the components A, B, D with catalyst D shortly before use to form a coating composition according to the invention, applying a layer of the coating composition on a substrate and allowing the curing thereof at temperature between 0 and 60° C.

Succinimid Examples

The foregoing more general discussion of the present invention will be further illustrated by the following specific examples, which are exemplary only.

Molecular weights were measured by GPC in THF, and expressed in polystyrene equivalent weights.

Viscosities were measured with a TA Instruments AR2000 Rheometer, using a cone and plate setup (cone 4 cm 1°) at 1 Pa stress.

Tube and Ball Method for Pot Life Determination:

A flat bottomed test tube (internal diameter 15 mm, length 12.5 cm), carrying two marks, 5 cm apart is filled with 20 ml of paint. A steel ball with a diameter of 8 mm is added, and the tube is closed with a snap cap. The tube is held under an angle of 10° and the steel ball is allowed to roll on the wall of the test tube. The time needed to roll between the two marks is taken as a measure for the viscosity. The time needed to double in viscosity is taken as the pot life. If necessary this time is calculated by linear interpolation between two measurements. This method was used for the pigmented formulations. For the clear formulations, a glass test tube (length 12 cm, diameter 13 mm) was filled with a stainless steel ball of 12 mm diameter, and the formulation to be studied to leave a very limited head space, and closed. Time was recorded for the ball to fall and pass a distance of 5 cm when the tube was tilted vertically. An average was taken over 2 measurements.

Drying Recorder Drying Time:

For determining the recorder drying time, paint was applied on a glass panel with a doctor blade with a 90µ gap. The drying time was measured with a Gardco electronic drying time recorder, type DT-5020, set on a cycle time of 60 minutes. Drying time was recorded as the time were the stylus left no more visible trace on the film.

TNO Cotton Ball Drying Times:

Dust-dry and tack-free times were measured according to the so-called TNO method with a wad of cotton-wool. Dust-dry time means the time needed for the coating after dropping the wad on the surface of the coating and after leaving it there for 10 seconds, to get no residue of the wool-cotton sticking onto the surface after blowing away the wad. For tack-free time the same holds but now a weight load of 1 kg is applied on the wad for 10 seconds.

Persoz Hardness Measurement:

Persoz pendulum hardness was measured in a climatized room at 23° C., and 55+/−5% relative humidity. Hardness is measured with a pendulum acc. Persoz as described in ASTM D 4366. For the gradient layer thickness panels, hardness is measured at different spots and corresponding layer thickness is measured. If necessary the hardness at a certain layer thickness is calculated by linear interpolation of the measurement at two different layer thicknesses. Layer thicknesses were measured with a Fischer Permascope MP40E-S.

Optical Evaluation Spayed Pigmented Paints:

Paint was sprayed with a devilbiss spraygun, nozzle FF-1.4 with an air pressure of 3.5 bar. The paint was prayed in a continuous layer over the entire surface of a 55×10 cm steel panel. A consecutive layer was sprayed starting 10 cm from the right edge. Several layers were built up, moving to the right so that a layer thickness gradient was build up from the left to right. Films were allowed to dry horizontally at 23° C., 45% RH. Layer thicknesses were measured with a Fischer Permascope MP40E-S. At 100µ layer thickness, a picture was taken with an Olympus SZX10 microscope (1× magn) equipped with a digital camera.

Wavescan Analysis:

The panels as described above were analyzed using the Wavescan II of Byk instruments. Data were stored using Autochart software from Byk. Analysis was done in the direction perpendicular to the thickness gradient. In this instrument the light of small laser diode is reflected by the surface of the sample under an angle of 60°, and the reflected light is detected at the gloss angle (60° opposite). During the measurement, the "wave-scan" is moved across the sample surface over a scan length of approx. 10 cm, with a data point being recorded every 0.027 mm. The surface structure of the sample modulates the light of the laser diode. The signal is divided into 5 wavelength ranges in the range of 0.1-30 mm and processed by mathematical filtering. For each of the 5 ranges a characteristic value (Wa 0.1-0.3 mm, Wb 0.3-1.0 mm, We 1.0-3.0 mm, Wd 3.0-10 mm, We 10-30 mm) as well as the typical wave-scan-values longwave (LW, approx. 1-10 mm) and shortwave (SW, approx. 0.3-1 mm) is calculated. Low values mean a smooth surface structure. Additionally a LED light source is installed in the wave-scan DOI and illuminates the surface under 20 degrees after passing an aperture. The scattered light is detected and a so-called dullness value (du, <0.1 mm) is measured. By using the three values of the short wave range Wa, Wb and du a DOI value is calculated. (see Osterhold e.a., Progress in Organic Coatings, 2009, vol. 65, no 4, pp. 440-443).

The following abbreviations were used for chemicals used in the experiments: DiTMPTA is di-trimethylolpropane-tetraacrylate (obtained from Aldrich (MW=466 g/mol)) or used as Sartomer SR355 (supplied commercially by Sartomer); Disperbyk 163 is a dispersant commercially supplied by Byk; Byk 310 and 315 are additives commercially supplied by ByK; Kronos 2310 is a TiO2 pigment commercially supplied by Kronos, TBAH is tetrabutylammonium hydroxide, BuAc is Butyl acetate, MEK is Methyl ethyl ketone (2-Butanone); EtAcAc is ethyl acetoacetate; DEC is diethyl carbonate; IPA is isopropanol; RT is room temperature.

Preparation of Malonate Polyester A

Into a reactor provided with a distilling column filed with Raschig rings were brought 17.31 mol of neopentyl glycol, 8.03 mol of hexahydrophthalic anhydride and 0.0047 mol of butyl stannoic acid. The mixture was polymerised at 240° C.

under nitrogen to an acid value of 0.2 mg KOH/g. The mixture was cooled down to 130° C. and 10.44 mol of diethylmalonate was added. The reaction mixture was heated to 170° C. and ethanol was removed under reduced pressure. The nearly colourless material was cooled down and diluted with 420 g of butyl acetate to a 90% solid content. The final resin had an acid value of 0.3 mg KOH/g solids, an OH value of 20 mg KOH/g solids and a weight average molecular weight of 3400 Da.

Catalyst Solution C1

Catalyst solution was prepared by reacting 59.4 g a TBAH solution (40% in water) with 13.5 g DEC (reacting overnight at RT), with 14.5 g isopropanol as co-solvent, following the corresponding ethocarbonate species development. Titration indicated that blocking was complete, and that the concentration of blocked base was 0.83 meq/g solution.

Catalyst Solution C2

To 43.6 g of a 45% aqueous solution of TBAH were added 36.6 g of isopropanol and 60 g of DEC. After standing overnight the mixture was filtered over paper. Titration showed that the catalyst contained 0.52 meq of blocked base per gram solution.

Comparative Example Formulation 1, Example Formulations 1-4

Formulations were prepared based on a malonate donor resin A, DiTMPTA as acryloyl donor resin, and the indicated amount of succinimide, and thinned to a viscosity of 160 mPas with a mixture of MEK/BuAc 1:1 by volume. This was mixed with an amount of catalyst solution C1. Listed in table A are the details of the overall composition. Catalyst amounts are 50 meq/g solids, water levels are 1.8 wt %, isopropanol at 0.7 wt %, ethanol level estimated at 0.2 wt %.

TABLE A

| Code | Comp1 | Ex1 | Ex2 | Ex 3 | Ex4 |
|---|---|---|---|---|---|
| malonate ester A/g | 15.0 | 15.0 | 15.0 | 15.0 | 15.0 |
| di-TMPTA/g | 6.6 | 6.6 | 6.6 | 6.6 | 6.6 |
| succinimide/mg | 0 | 149 | 174 | 199 | 298 |
| mole % succinimide on cat | 0 | 150 | 175 | 200 | 300 |
| MEK/BuAc (1:1)/g | 4.5 | 4.5 | 4.5 | 4.5 | 4.5 |
| catalyst C1/g | 1.2 | 1.2 | 1.2 | 1.2 | 1.2 |

Of these formulations, the drying behaviour at room temperature for films leading to a dry film thickness of around 70-75 mu was followed with TNO cotton ball drying tests, and Persoz pendulum hardness development was determined; also these results are listed in Table B.

TABLE B

| Code | Comp1 | Ex1 | Ex2 | Ex3 | Ex4 |
|---|---|---|---|---|---|
| mole % succinimide on cat | 0 | 150 | 175 | 200 | 300 |
| TNO-drying | | | | | |
| dust-dry (min) | 10' | 25' | 25' | 30' | 65' |
| tack-free (min) | 10' | 30' | 30' | 35' | 70' |
| Persoz hardness (sec) after time at RT: | | | | | |
| 4 h | 31 | | | 107 | 132 |
| 1 night | 42 | | | 126 | 152 |
| 1 week | 66 | 131 | 137 | 146 | 231 |

It can be seen that whereas comparative example 1 shows an extremely fast drying, the actual Persoz hardness levels are low presumably due to solvent entrapment in the system. Moreover, the appearance of this comparative example 1 is poor. Upon addition of low levels of succinimide (slightly higher than the levels of catalyst used), some retardation of the drying is seen, but still giving drying times considered as fast; however, it can also be observed that the Persoz hardness development is strongly improved. Simultaneously, the example films with succinimide exhibit a better appearance than comparative example 1.

Example formulations 5-7, and comparative example formulations 2-3 were prepared as pigmented paints, having compositions as tabulated in Table C (amounts in grams).

TABLE C

| Code | Ex5 | Ex6 | Ex7 | Comp2 | Comp3 |
|---|---|---|---|---|---|
| Sartomer SR355 | 38.19 | 38.19 | 38.19 | 38.19 | 39.19 |
| Disperbyk 163 | 2.39 | 2.39 | 2.39 | 2.39 | 2.39 |
| Kronos 2310 | 80.12 | 80.12 | 80.12 | 80.12 | 80.12 |
| malonate polyester A | 58.70 | 67.69 | 67.69 | 58.70 | 67.69 |
| Sartomer SR 355 | 4.22 | 1.15 | 1.15 | 4.22 | 4.22 |
| EtAcAc | 4.81 | 0.00 | 0.00 | 4.81 | 0.00 |
| Byk 310/315 [1:4 by mass] | 0.60 | 0.60 | 0.60 | 0.60 | 0.60 |
| succinimide | 0.79 | 0.79 | 1.58 | 0.00 | 0.00 |
| BuAc | 2.52 | 2.52 | 2.52 | 2.52 | 2.52 |
| MEK | 7.20 | 7.20 | 7.20 | 7.20 | 7.20 |
| catalyst solution C2 | 9.34 | 9.34 | 9.34 | 9.34 | 9.34 |
| recorder drying time (min) | 14 | 15 | 44 | 4.3 | 8 |
| potlife (min) | 39 | 35 | 37 | 17 | 29 |
| Persoz hardness (sec) after 24 h (50 mu dry film) | 147 | 147 | 145 | 85 | 66 |

Pot life of these pigmented paints were measured, and drying times of these paints drawn onto glass panels were determined with a drying recorder. These paints were also applied by spraying onto a steel panel to obtain gradient film thickness panel. Persoz hardness at 50 mu dry film thickness was determined after 24 hr RT cure; microscope pictures were taken of the resulting coatings on these panels at approximately 100 mu dry film thickness (Appendix: Photographs). Also, pot life of these paints were measured. Results are included in table C.

It can be observed from a comparison of comparative example 3 with examples 6 and 7, that the addition of succinimide to the formulation gives clear advantages in Persoz hardness build-up, and some advantage in pot life. Example 7, with a higher level of succinimide, shows a significant increase in drying time, the 44 minute value can however still be considered as an acceptable to good value. Appearance of panels from examples 6 and 7 is much better than that of panels from comparative example 3, as can be judged from comparing the microscope photographs, comparative example 3 showing many more defects (Appendix: Photographs).

Similar conclusions can be drawn from a comparison of comparative example 2, with example 5, now based on a formulation with acetoacetate included besides malonate as RMA donor groups. Example 5 (with succinimide added) exhibits higher Persoz hardness, a better pot life, and a better appearance (Appendix: Photographs) than comparative example 2 (not containing succinimide).

Example 8 was prepared and evaluated in a similar way as discussed above for example 5-7, the composition and results given below in table D (amounts in grams). It can be seen that the additional presence of 1,2,4-triazole (when compared to example 6) leads to a significant improvement in pot-life, other advantages being retained.

TABLE D

| Code | Ex8 |
| --- | --- |
| Sartomer SR355 | 38.19 |
| Disperbyk 163 | 2.39 |
| Kronos 2310 | 80.12 |
| Malonate polyester A | 67.69 |
| Sartomer SR 355 | 1.15 |
| EtAcAc | 0.00 |
| Byk 310/315 [1:4 by mass] | 0.60 |
| 1,2,4-triazole | 0.96 |
| Succinimide (s) | 0.79 |
| BuAc | 2.52 |
| MEK | 7.20 |
| catalyst solution C2 | 9.34 |
| recorder drying time (min) | 16 |
| Potlife (min) | 70 |
| Persoz hardness (sec) after 24 h (50 mu dry film) | 147 |

Example formulations 9 and 10, and comparative example formulations 4 and 5 were formulated and evaluated along similar lines, now also including Wavescan analysis to have a quantitative indication of the quality of the appearance. Compositions and results are given in Table E (amounts in grams).

TABLE E

| Code | Ex9 | Ex10 | Comp4 | Comp5 |
| --- | --- | --- | --- | --- |
| Sartomer | 19.07 | 19.07 | 19.07 | 19.07 |
| Disperbyk 163 | 1.19 | 1.19 | 1.19 | 1.19 |
| Kronos 2310 | 40.01 | 40.01 | 40.01 | 40.01 |
| Malonate polyester A | 29.35 | 33.85 | 29.35 | 33.85 |
| Sartomer SR 355 | 2.11 | 0.58 | 2.11 | 0.58 |
| EtAcAc | 2.41 | — | 2.41 | — |
| Byk 310/315 [1:4 by mass] | 0.30 | 0.30 | 0.30 | 0.30 |
| Succinimide | 0.40 | 0.40 | — | — |
| BuAc | 1.26 | 1.26 | 1.26 | 1.26 |
| MEK | 3.60 | 3.60 | 3.60 | 3.60 |
| Catalyst solution C2 | 4.67 | 4.67 | 4.67 | 4.67 |
| Persoz hardness (s) at 50μ | 122 | 125 | 97 | 93 |
| Layer thickness (μ) | 51 | 56 | 58 | 58 |
| du (dullness) | 6.30 | 6.40 | 8.80 | 11.30 |
| Longwave | 3.80 | 1.90 | 5.30 | 7.80 |
| Shortwave | 2.20 | 6.40 | 18.20 | 24.10 |
| DOI (Dorigon) | 94.10 | 93.90 | 91.50 | 88.40 |
| Layer thickness (μ) | 92 | 93 | 92 | 86 |
| du (dullness) | 5.90 | 8.70 | 11.60 | 23.40 |
| Longwave | 1.00 | 3.70 | 11.50 | 25.10 |
| Shortwave | 9.50 | 24.90 | 29.70 | 60.60 |
| DOI (Dorigon) | 94.10 | 90.20 | 88.10 | 74.90 |

Example formulation 9 can be compared with comparative formulation example 4, example formulation 10 can be compared with comparative formulation example 5, difference being the presence of low amounts of succinimide. It can from both comparisons be concluded that the presence of succinimide, besides the improved Persoz hardness, leads to significantly improved values for longwave and shortwave roughness, dullness and DOI.

Example 11

Impact on Conversion Kinetics

The conversion of the acryloyls in the system can be followed by FTIR, focusing on the 809 cm$^{-1}$ band characteristic of the acryloyl. Doing that, the impact of added succinimide on total conversion can be made visible. Two systems were formulated (according to compositions of comparative example 1 (without succinimide) and example formulation 1 (with 150% succinimide relative to solids). FIG. 1 compares the conversion of these systems after application on top of an ATR crystal, the IR beam probing the deepest layers, close to the substrate. Initial conversion of the formulation without the succinimide is fast, which is also the cause for solvent entrapment and potential appearance problems. It can be seen that the addition of succinimide, even at these very low levels, leads to a significant retardation of the initial conversion; simultaneously, it illustrates that after this initial retardation period, the conversion rate is accelerating, so that the rate of cure towards higher conversions is still fast after this initial delay.

Example 12

Determination of Michael Addition Reactivity of Succinimide 5 grams of succinimide (50.5 mmole) were dissolved in a mixture of 42 grams of butyl acrylate and 42 grams of methanol, and maintained at room temperature as such, or after adding a strong base (9.82 grams of a 1.12 meq/g solution of tetrabutylammonium hydroxide in methanol, 11 meq). Subsequently, the concentration of succinimide is determined as a function of time by taking samples, neutralizing with a known excess of HCl in water, and backtitration with a KOH solution. Without base initiation, no significant loss of succinimide N—H in this solution is observed in two weeks. With the base added, the succinimide concentration can be seen to decrease with time, as illustrated in the table F below. Succinimide concentration is expressed as % relative to the theoretical level based on used amounts.

TABLE F

| Time (min) | Succinimide remaining (%) |
| --- | --- |
| 3 | 99 |
| 30 | 87 |
| 60 | 77 |
| 120 | 60 |
| 180 | 48 |

At this catalyst level ([succinimide]/[base]=5), it takes about an hour to lose 25% of the succinimide acidic protons to be consumed. Under these conditions, dimethylmalonate (instead of succinimide) would react much faster with the acrylate.

Thick Layers Examples

Pot-Life Measurement:

A flat bottomed test tube (internal diameter 15 mm, length 12.5 cm), carrying two marks, 5 cm apart is filled with 20 ml of paint. A steel ball with a diameter of 8 mm is added, and the tube is closed with a snap cap. The tube is held under an angle of 10° and the steel ball is allowed to roll on the wall of the test tube. The time needed to roll between the two marks is taken as a measure for the viscosity. The time needed to double in viscosity is taken as the pot life. If necessary this time is calculated by linear interpolation between two measurements. This method was used for the pigmented formulations.

Drying Time:

For determining the recorder drying time, paint was applied on a glass panel with a doctor blade with a 90μ gap. The drying time was measured with a Gardco electronic drying time recorder, type DT-5020, set on a cycle time of 60 minutes. Drying time was recorded as the time were the stylus left no more visible trace on the film.

Viscosity Measurement:

The viscosity of the resins was measured with a Physica MCR300 viscosimeter, using measuring cone CP50-1 at 23° C.

Persoz Hardness Measurement:

Persoz pendulum hardness was measured in a climatized room at 23° C., and 55+/−5% relative humidity. Hardness is measured with a pendulum acc. Persoz as described in ASTM D 4366. For the gradient layer thickness panels, hardness is measured at different spots and corresponding layer thickness is measured. If necessary the hardness at a certain layer thickness is calculated by linear interpolation of the measurement at two different layer thicknesses.

Reported molecular weights were measured by GPC, and expressed in polystyrene equivalent weights.

The following abbreviations were used for chemicals used in the experiments: DiTMPTA is di-trimethylolpropane-tetraacrylate (obtained from Aldrich, (MW=466 g/mol)) or used as Sartomer SR355 (commercially available by Sartomer); Disperbyk 163 is a dispersant commercially supplied by Byk; Byk 310 and 315 are additives commercially supplied by ByK; Kronos 2310 is a TiO2 pigment commercially supplied by Kronos; TBAH is tetrabutylammonium hydroxide; BuAc is Butyl acetate, MEK is Methyl ethyl ketone (2-Butanone); EtAcAc is ethyl acetoacetate; DEC is diethyl carbonate; IPA is isopropanol; RT is room temperature.

Preparation of Resin A

Into a reactor provided with a distilling column filed with Raschig rings were brought 17.31 moles of neopentyl glycol, 8.03 moles of hexahydrophthalic anhydride and 0.0047 moles of butyl stannoic acid. The mixture was polymerised at 240° C. under nitrogen to an acid value of 0.2 mg KOH/g. The mixture was cooled down to 130° C. and 10.44 moles of diethylmalonate were added. The reaction mixture was heated to 170° C. and ethanol was removed under reduced pressure. The resin was cooled down and diluted with 420 g of butyl acetate to a 90% solid content. The final resin has an acid value of 0.3 mg KOH/g solids, a OH value of 20 mg KOH/g solids and a weight average molecular weight of 3400 Da.

Preparation of Resin B

To 757 g of the resin A were added 45 g of butyl acetate. The mixture was brought to 30° under stirring. At 30° C. 3.560 g of (S)-1-Phenylethylamine (ChiPros® ex BASF) were added. The funnel was rinsed with 10 grams of butyl acetate which were added to the mixture. 2.47 grams of hexamethylediisocyanate dissolved in 16.2 g of butyl acetate were added drop wise through a funnel in 4 minutes under vigorous stirring (forming first sag control agent (SCA) by reaction with the (S)-1-Phenylethylamine). The temperature rose to 38° C. The funnel was rinsed with 6.4 g of butyl acetate, which were added to the mixture, which was kept stirring for 15 more minutes. Subsequently, 6.41 grams of butyl amine were added (for forming the second SCA with hexamethylendiisocyanate) and the funnel was rinsed with 10 g of butyl acetate. 5.06 g of hexamethylendiisocyanate, dissolved in 25.70 g of butyl acetate were added drop wise through a funnel in 15 minutes under vigorous stirring. The temperature rose to 45° C. The funnel was rinsed with 10 g of butyl acetate which was added to the mixture. The mixture was stirred for 10 minutes and then diluted with 50 of butyl acetate. The mixture was cooled under stirring to 35° C. The final resins had a solids content of 72.5%. The viscosity of the resin was 10 Pas at 1 sec$^{-1}$ and 0.58 Pas at 1000 sec$^{-1}$.

Catalyst Solution C1

To 43.6 g of a 45% aqueous solution of tetrabutyl ammonium hydroxide were added 36.6 g of isopropanol and 60 g of diethylcarbonate. After standing overnight the mixture was filtered over paper and 14.5 g of succinimid were dissolved in it.

Catalyst Solution C2

54.6 g of tetrabutylammonium succinimide (available from Sigma Aldrich) was dissolved in 45.4 g of isopropanol. Acid base titration gives a concentration of 1.529 meq/g of product. This catalyst does not include a carbonate catalyst.

Catalyst Solution C3

A catalyst solution C3 was prepared as catalyst solution C1, except that the succinimide was omitted.

Example 1

Preparation of Paint 1

Paint 1 was made by dispersing 91.44 g of Kronos 2310 in 43.85 g of Sartomer SR355 with the aid of 2.73 g of Disperbyk 163. To this were added 29.94 g of the resin A and 46.17 g of the resin B. Subsequently, 4.82 of Sartomer SR355 and 5.5 g of ethyl acetoacetate, 0.14 g of Byk 310 and 0.55 g of Byk 315 were added. The paint was finally diluted with 4.02 g of butylacetate and 9.37 g of methylethylketone. 11.58 g of catalyst solution C1 were stirred into 258.26 g of the paint 1. The mixture was sprayed on a 30×20 cm steel plate of 0.5 mm thickness tin plate into which were punched 12, 1 cm diameter holes, 2 cm apart. The paint was sprayed with increasing layer thickness. After spraying the panel was kept vertically. The paint could be sprayed up to 150 micron as a haze free fim without the production of tears on the borders of the holes.

Example 2

Preparation of Paint 2

Paint 2 was prepared in a similar way as paint 1, except that the 46.17 g of resin B was entirely replaced by a mixture of 39.38 g of the resin A and 6.78 g of butylacetate, so paint 2 only contains resin A and by consequence has no SCA. In a similar way catalyst C1 was added and the paint 2 was sprayed in similar way. The coating developed a haze free film up to 150 micron but severe tears developed from a layer thickness of 50 microns on.

Example 3

Preparation of Paint 3

Paint 3 was prepared the same way as paint 2, except that 1.6 g of catalyst solution C2 was added to 100 g of paint. The paint dried in a haze- and wrinkle-free film, even at a thickness of up to 150 micron. The coating did develop tears from a layer thickness of 50 microns on.

Comparative Experiment

Preparation of Paint CE1

Comparative paint CE1 was prepared similar to paint 2, except that the ethylacetoacetate was replaced by 4.5 g of resin A. 4.16 g of catalyst solution C3 was added to the paint CE1 and sprayed in a similar fashion as the paint 1. Not only developed the paint tears from a thickness of 50 micron on, it also showed pronounced wrinkling at layer thicknesses of 60 micron and higher.

Overview Re Paint Compositions and Catalyst Solution

|  | acetoacetate | Succinimide | SCA | Appearance |
|---|---|---|---|---|
| Paint 1 | yes | yes | yes | No wrinkling, no sagging up to 150 mu |
| Paint 2 | yes | yes | no | No wrinkling up to 150 mu, sagging from 50 mu |
| Paint 3 | yes | TBA-Succinimide | no | No wrinkling up to 150 mu, sagging from 50 mu |
| CE1 | No | no | no | wrinkling from 60 mu and sagging from 50 mu |

Example 4

Formulations were prepared, spray-applied to bonder panels and dried at RT. The appearance of the panels was analyzed with a Byk Wavescan instrument. Pendulum hardness (in sec, after 1 day), and longwave/shortwave numbers (lower is better) are reported in the table below, along with composition data. The catalyst solution was similar to C-1, with a concentration of 0.7 meq/g; thinner used was a 1:1 (by wt) mixture of butylacetate and MEK. The advantageous effect of the formulations according to the invention on appearance can be seen.

|  | COMP | A | B | C | D | E |
|---|---|---|---|---|---|---|
| Sartomer SR355 | 177.0 | 175.3 | 172.3 | 171.9 | 171.2 | 170.5 |
| Disperbyk 163 | 11.1 | 11.0 | 10.8 | 10.8 | 10.7 | 10.7 |
| Kronos 2310 | 371.0 | 367.7 | 361.3 | 360.5 | 359.0 | 357.5 |
| Resin A | 298.0 | 218.7 | 237.0 | 236.5 | 235.5 | 234.5 |
| SCA resin B | 0.0 | 91.1 | 98.8 | 98.6 | 98.2 | 97.8 |
| Sartomer SR355 | 17.0 | 16.8 | 5.7 | 5.7 | 5.7 | 5.7 |
| EtAcAc | 16.5 | 16.4 | 0.0 | 0.0 | 0.0 | 0.0 |
| Byk 310/315 [1:4] | 2.8 | 2.8 | 3.0 | 3.0 | 3.0 | 3.0 |
| Succinimide | 0.0 | 4.3 | 4.2 | 4.2 | 4.2 | 4.2 |
| Benzotriazole | 0.0 | 0.0 | 2.2 | 4.4 | 8.6 | 12.5 |
| MEK | 33.0 | 33.1 | 36.0 | 35.9 | 35.8 | 35.6 |
| BuAc | 11.7 | 11.6 | 12.6 | 12.6 | 12.5 | 12.5 |
| PrOH | 5.6 | 5.5 | 6.0 | 6.0 | 6.0 | 5.9 |
| Thinner | 46.2 | 45.9 | 50.0 | 49.9 | 49.7 | 49.5 |
| catalyst solution (0.7 meq/g) | 25.0 | 24.7 | 23.2 | 23.2 | 23.1 | 23.0 |
| layer thickness (μm) | 75 | 73.9 | 71.7 | 75 | 74.7 | 77.1 |
| hardness Persoz | 50 | 134 | 127 | 128 | 124 | 130 |
| Longwave | 17 | 2.4 | 5.5 | 4.5 | 3.8 | 2.9 |
| Shortwave | 35 | 11.7 | 17.9 | 15.5 | 9.8 | 8.5 |
| layer thickness (μm) |  | 144 | 142 | 143 | 143 | 150 |
| hardness Persoz |  | 64 | 65 | 67 | 67 | 76 |
| Longwave |  | 2.2 | 2.3 | 2.1 | 1.4 | 2.1 |
| Shortwave |  | 12 | 11.4 | 9.9 | 7.6 | 14.7 |

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An RMA crosslinkable composition for making thick coating layers comprising at least one crosslinkable component comprising reactive components A and B each comprising at least 2 reactive groups wherein the at least 2 reactive groups of component A are RMA donor group being C—H acidic protons in activated methylene or methine groups, and the at least 2 reactive groups of component B are RMA acceptor group being activated C═C unsaturated groups, to achieve crosslinking by Real Michael Addition reaction, said composition further comprising a base catalyst C, an X—H group containing component D, of a nature different from A, that is also a Michael addition donor reactable with component B under the action of base catalyst C, wherein X is C, N, P, O or S; wherein component D comprises one or more components D(1) comprising C—H acidic protons, X is C, in activated methylene, methyl, or methine groups, and one or more components D(2) different from component D(1).

2. The crosslinkable composition according to claim 1, in which the RMA acceptor groups B are acryloyl groups.

3. The crosslinkable composition according to claim 1, in which the RMA donor groups A originate for more than 50% from malonate groups.

4. The crosslinkable composition according to claim 1, the X—H group of component D being characterized by a pKa, defined in aqueous environment, of at least one unit, less than that of the dominant type of C—H groups in component A.

5. The crosslinkable composition according to claim 1, wherein the pKa of the X—H group in component D is lower than 13.

6. The crosslinkable composition according to claim 1, wherein the one or more components D(2) comprise an N—H acidic compound, X is N.

7. The crosslinkable composition according to claim 6 wherein component D(1) is an acetoacetate and/or acetylacetone.

8. The crosslinkable composition according to claim 1 wherein N—H group containing component D contains the N—H group as part of a group Ar—NH—(C═O)—, —(C═O)—NH—(C═O)—, or of a group —NH—(O═S═O)— or is a heterocycle in which the nitrogen of the N—H group is contained in a heterocyclic ring.

9. The crosslinkable composition according to claim 8, wherein component D is chosen from the group of imide derivatives, cyclic imide derivatives, succinimide or glutarimide, hydantoin derivatives, 5,5-dimethylhydrantoin, sulfonamide, aromatic sulfonamide, benzene- or toluene-sulfonamide, N—H group containing heterocycles, triazole, benzotriazole, pyrazole, nitro-imidazoles or uracil.

10. The crosslinkable composition according to claim 1 wherein C—H groups in component D(1) are present in an amount between 5 and 50 mol % to total RMA donor C—H.

11. The crosslinkable composition according to claim 1 comprising
  a. between 5 and 95 wt % of a component A with at least 2 acidic protons C—H in activated methylene or methine, and
  b. between 5 and 95 wt % of a component B with at least 2 activated unsaturated groups, wt % relative to the total weight of the crosslinkable composition, and
  c. a catalyst C that contains, or is able to generate a basic catalyst capable of activating the RMA reaction between components A and B, at levels of 0.0001 and 0.5 meq/g solid components,
  d. component D in an amount such that the amount of X—H in component D is at least 50 mole % relative to base generated by component C, and less than 30 mole % of C—H active groups from component A,
  e. a sag control component E.

12. The crosslinkable composition according to claim 11 further comprising additional different C—H containing component D(1) in an amount such that the amount of C—H groups in component D(1) are present in an amount between 5 and 50 mol % to total RMA donor C—H.

13. The crosslinkable composition according to claim 11 further comprising between 0.1 and 80 wt % of an organic solvent.

14. The crosslinkable composition according to claim 11 further comprising at least 1 wt % of a primary alcohol and between 0.1 and 10 wt % water.

15. The RMA crosslinkable composition of claim 1, further comprising a sag control component E.

16. A kit of parts for the manufacture of the composition according to claim 1 comprising a part 1 comprising components A and B and part 2 comprising component C and D or part 1 comprising components A, B and D and part 2 comprising component C.

17. Method for the manufacture of coating compositions, films or inks, the method comprising the step of using the crosslinkable composition according to claim 1.

18. Coating composition comprising the crosslinking composition according to claim 1 and further comprising one or more coating additives, pigments, co-binder, solvents.

* * * * *